United States Patent
Tikhonov et al.

(10) Patent No.: US 9,350,017 B2
(45) Date of Patent: *May 24, 2016

(54) HIGH PERFORMANCE LITHIUM OR LITHIUM ION CELL

(71) Applicant: A123 Systems LLC, Waltham, MA (US)

(72) Inventors: Konstantin Tikhonov, Pleasanton, CA (US); Tobias Johnson, Union City, CA (US); Jesse Chau, Newark, CA (US); Ka Ki Yip, San Leandro, CA (US); Marc Juzkow, Livermore, CA (US)

(73) Assignee: A123 Systems LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,569

(22) Filed: Mar. 15, 2013

(65) Prior Publication Data

US 2013/0288138 A1    Oct. 31, 2013

Related U.S. Application Data

(63) Continuation-in-part of application No. 13/273,114, filed on Oct. 13, 2011.

(60) Provisional application No. 61/413,171, filed on Nov. 12, 2010.

(51) Int. Cl.
| | |
|---|---|
| *H01M 4/62* | (2006.01) |
| *H01M 4/66* | (2006.01) |
| *H01M 4/131* | (2010.01) |
| *H01M 4/133* | (2010.01) |

(Continued)

(52) U.S. Cl.
CPC .............. *H01M 4/38* (2013.01); *H01M 4/131* (2013.01); *H01M 4/136* (2013.01); *H01M 4/625* (2013.01); *H01M 4/667* (2013.01); *H01M 10/0567* (2013.01); *H01M 4/587* (2013.01); *H01M 4/661* (2013.01); *H01M 10/052* (2013.01); *H01M 10/0568* (2013.01); *H01M 2300/004* (2013.01); *Y02E 60/122* (2013.01)

(58) Field of Classification Search
None
See application file for complete search history.

(56) References Cited

U.S. PATENT DOCUMENTS

| | | |
|---|---|---|
| 3,645,792 A | 2/1972 | Hacha |
| 5,456,000 A | 10/1995 | Gozdz et al. |

(Continued)

FOREIGN PATENT DOCUMENTS

| | | |
|---|---|---|
| CN | 1463473 A | 12/2003 |
| EP | 0731518 | 9/1996 |

(Continued)

OTHER PUBLICATIONS

Office Action, mailed Mar. 16, 2012, U.S. Appl. No. 13/350,722.
(Continued)

*Primary Examiner* — Maria J Laios
*Assistant Examiner* — Robert S Carrico
(74) *Attorney, Agent, or Firm* — Alleman Hall McCoy Russell & Tuttle LLP

(57) ABSTRACT

Disclosed herein are lithium or lithium-ion batteries that employ an aluminum or aluminum alloy current collector protected by conductive coating in combination with electrolyte containing aluminum corrosion inhibitor and a fluorinated lithium imide or methide electrolyte which exhibit surprisingly long cycle life at high temperature.

17 Claims, 10 Drawing Sheets

(51) Int. Cl.
*H01M 4/134* (2010.01)
*H01M 4/136* (2010.01)
*H01M 4/38* (2006.01)
*H01M 4/485* (2010.01)
*H01M 4/587* (2010.01)
*H01M 10/0525* (2010.01)
*H01M 10/0567* (2010.01)
*H01M 10/0568* (2010.01)
*H01M 10/052* (2010.01)

(56) References Cited

U.S. PATENT DOCUMENTS

| | | | |
|---|---|---|---|
| 5,494,762 | A | 2/1996 | Isoyama et al. |
| 5,916,475 | A * | 6/1999 | Michot et al. ............ 252/62.2 |
| 6,699,623 | B1 | 3/2004 | Dai |
| 6,723,472 | B2 | 4/2004 | Nakanishi et al. |
| 6,787,267 | B2 | 9/2004 | Tsujioka et al. |
| 7,083,878 | B2 | 8/2006 | Kotato et al. |
| 7,206,189 | B2 | 4/2007 | Reynolds, III |
| 7,261,972 | B2 | 8/2007 | Inada et al. |
| 7,348,102 | B2 | 3/2008 | Li et al. |
| 2001/0028980 | A1* | 10/2001 | Yoshimura et al. ...... 429/231.95 |
| 2003/0112580 | A1 | 6/2003 | Reynolds, III et al. |
| 2003/0148187 | A1 | 8/2003 | Yamaguchi et al. |
| 2004/0219433 | A1 | 11/2004 | Besner et al. |
| 2006/0063072 | A1 | 3/2006 | Li et al. |
| 2007/0076349 | A1 | 4/2007 | Dementiev et al. |
| 2008/0102370 | A1 | 5/2008 | Kashiwagi |
| 2008/0118835 | A1 | 5/2008 | Hur et al. |
| 2009/0023074 | A1 | 1/2009 | Matsui et al. |

FOREIGN PATENT DOCUMENTS

| | | |
|---|---|---|
| EP | 0807985 | 11/1997 |
| EP | 1391948 A1 | 2/2004 |
| EP | 1981103 A1 | 10/2008 |
| EP | 2211401 A2 | 7/2010 |
| EP | 2518819 A1 | 10/2012 |
| JP | H11185807 A | 7/1999 |
| JP | H11354154 A | 12/1999 |
| JP | 2001-052744 | 2/2001 |
| JP | 2002203562 A | 7/2002 |
| JP | 2002-279974 A | 9/2002 |
| JP | 2002-373704 A | 12/2002 |
| JP | 2003-11268 A | 4/2003 |
| JP | 2003208925 A | 7/2003 |
| JP | 2004055247 A | 2/2004 |
| JP | 2004127556 A | 4/2004 |
| JP | 2004-247062 A | 9/2004 |
| JP | 2008-198434 A | 8/2008 |
| JP | 2009163971 A | 7/2009 |
| JP | 2009252489 A | 10/2009 |
| JP | 2010135316 A | 6/2010 |
| KR | 10-2002-0018184 A | 3/2002 |
| KR | 2003-0073168 A | 9/2003 |
| KR | 10-2006-0019766 A | 3/2006 |
| WO | 99/30381 A1 | 6/1999 |
| WO | 00/11742 A1 | 3/2000 |
| WO | 2009049220 A1 | 4/2009 |
| WO | WO 2010053200 A1 * | 5/2010 |

OTHER PUBLICATIONS

Notice of Allowance, mailed May 11, 2012, U.S. Appl. No. 13/350,722.
Translation of Japanese Office Action Issued in Japanese Patent Application No. 2013-538756, Office Action originally mailed on Jun. 3, 2014, 4 pages.
European Patent Office, Extended European Search Report of EP11839945.0, Germany, Jun. 4, 2014, 9 pages.
Korean Patent Office, Office Action issued in Korean Patent Application No. 2013-7015027, Oct. 28, 2014, 6 pages.
European Patent Office, Office Action Issued in European Patent Application No. 11839945.0, Mar. 26, 2015, Germany, 4 pages.

* cited by examiner

HIGH PERFORMANCE LITHIUM OR LITHIUM ION CELL

CROSS-REFERENCES TO RELATED APPLICATIONS

This application is a continuation-in-part application of U.S. application Ser. No. 13/273,114, filed Oct. 13, 2011, which application claims priority to U.S. Provisional Patent Application No. 61/413,171, filed Nov. 12, 2010, which is hereby incorporated by reference for all purposes.

FIELD OF THE INVENTION

In certain preferred embodiments, the present invention deals with lithium and lithium-ion batteries which exhibit surprisingly long cycle life at high temperature, and with a process for the fabrication thereof.

BACKGROUND OF THE INVENTION

Lithium imide salts such as $LiN(CF_3SO_2)_2$ in a nonaqueous solvent can cause corrosion to metal collectors, most typically aluminum foil, in lithium secondary batteries. Corrosion of the aluminum foil can shorten the battery life, rendering the battery impractical for some applications. However, if this corrosion can be reduced or limited, the life of the battery can be extended, increasing its usefulness. It is well known to one skilled in the art that lithium imide salts have superior thermal and hydrolytic stability compared to lithium hexafluorophosphate commonly used in Li-ion batteries.

Li et al. in U.S. Pat. No. 7,348,102 describes a metal current collector with a carbon coating to protect against corrosion in lithium secondary batteries. However, the electrolyte employed is of molten salt, not a lithium salt electrolyte in a mixture or in organic solvents.

Ro et al. in U.S. Pat. No. 7,327,556 discloses the use of aluminum metal coated with carbon. The carbon coating on the aluminum surface improves the adhesion of an applied active material. However, the coating is not used for corrosion prevention in rechargeable lithium cells, and the electrolyte described does not corrode aluminum.

So-Hyun Hur et al. in KR Pat. No 10-2006-0114543 describes the use of a lithium salt mixture of $LiPF_6$ and a lithium-imide-based salt. However, no protective, conductive coating is employed. The mixture of salts, especially with lithium imide salts, can cause corrosion in lithium-ion cells, resulting in cell degradation and loss of performance.

In view of the shortcomings of the prior art, the present invention provides lithium or lithium-ion electrochemical cells, wherein corrosion is reduced and the life of the battery is extended, thereby increasing its usefulness.

BRIEF SUMMARY OF THE INVENTION

In one embodiment, the present invention provides a lithium or lithium-ion electrochemical cell, the cell comprising:
(i) an anode, the anode comprising an anode active material in electronically conductive contact with an anode current collector;
(ii) a cathode exhibiting an upper charging voltage in the range of 3 to 5 volts with respect to a $Li/Li^+$ reference electrode, the cathode comprising a cathode active material in electronically conductive contact with a cathode current collector;
the cathode active material comprising a lithium insertion transition metal oxide, phosphate, or sulfate; and the cathode current collector having a protective, conductive coating;
(iii) an ion-permeable membrane as a separator between the anode and cathode, and
(iv) an electrolyte solution in ionically conductive contact with the anode and cathode, the electrolyte solution comprising an additive, a lithium compound, and an aprotic polar solvent or a polymer;
the additive providing corrosion protection of the cathode current collector, the anode current collector, or both current collectors; wherein the additive is selected from the group LiBOB, LiF, LiFOB, $LiPF_6$, $LiBF_4$, $LiAsF_6$, $LiClO_4$, and $LiPF_n(R_f)_m$; wherein n+m is 6, and $R_f$ is $CF_3$ or $C_2F_5$,
the lithium compound being at a concentration from about 0.1 to 3 molar,
the lithium compound being represented by the formula:

$$R_f^1 SO_2 X^- (Li^+) YZ_a$$

wherein
$R_f^1$ is an independently selected from F, or perfluoroalkyl radical of 1-4 carbons optionally interrupted by an ether oxygen;
X is C or N;
a is 0 or 1, with the proviso that a is 1 when X is C, and a is 0 when X is N;
wherein, when X is C and a is 1:
Y and Z are electron-withdrawing groups each independently selected from the group CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and H, with the proviso that Y and Z cannot both be H;
wherein R is an alkyl group of 1-6 carbons optionally interrupted by an ether oxygen and optionally substituted with an aryl group; and
$R_f^2$ and $R_f^3$ are each independently selected perfluoroalkyl radicals of 1-4 carbons optionally interrupted by an ether oxygen; and
wherein, when X is N and a is 0:
Y is an electron-withdrawing group $SO_2R_f^6$,
wherein $R_f^6$ is $-(R_f^4 SO_2 N^-(Li^+)SO_2)_m R_f^5$;
m is 0 or 1;
$R_f^4$ is $-C_n F_{2n}$; where n is from 1 to 4; and wherein $R_f^4$ is optionally interrupted by an ether oxygen; and
$R_f^5$ is $-C_n F_{2n+1}$ where each n is 0-4 such as 0, 1, 2, 3, 4, wherein $R_f^5$ is optionally interrupted by one or more ether oxygens.

Preferably, the cathode current collector comprises aluminum or an aluminum alloy. Preferably, the protective, conductive coating comprises conductive carbon or graphite. Preferably, the protective, conductive coating has a thickness of less than or equal to 10 micrometers such as 0.1, 1, 2, 3, 4, 5, 6, 7, 8, 9 or 10 microns.

In a second embodiment, the present invention provides a process for forming an electrochemical cell, the process comprising:
producing a protective, conductive coating on a cathode current collector;
placing the cathode active material in contact with the cathode current collector;
placing the anode active material in contact with the anode current collector;
drying and pressing the anode and the cathode;

assembling the anode and the cathode into the electrochemical cell together with a porous membrane; and
filling the cell with electrolyte containing an electrolyte solution in ionically conductive contact with the anode and cathode, the electrolyte solution comprising an additive, a lithium compound, and an aprotic polar solvent or a polymer;
the additive providing corrosion protection of the cathode current collector, the anode current collector, or both current collectors; wherein the additive is selected from the group LiBOB, LiF, LiFOB, $LiPF_6$, $LiBF_4$, $LiAsF_6$, $LiClO_4$, and $LiPF_n(R_f)_m$; wherein n+m is 6, and $R_f$ is $CF_3$ or $C_2F_5$,
the lithium compound being at a concentration from about 0.1 to 3 molar,
the lithium compound being represented by the formula:

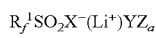

$$R_f^1 SO_2 X^-(Li^+) YZ_a$$

wherein
$R_f^1$ is an independently selected from F, or perfluoroalkyl radical of 1-4 carbons optionally interrupted by an ether oxygen;
X is C or N;
a is 0 or 1, with the proviso that a is 1 when X is C, and a is 0 when X is N;
wherein, when X is C and a is 1:
Y and Z are electron-withdrawing groups each independently selected from the group CN, $SO_2R_f^2$, $SO_2R$, $P(O)(OR)_2$, $CO_2R$, $P(O)R_2$, $C(O)R_f^3$, C(O)R, cycloalkenyl groups formed therewith, and H, with the proviso that Y and Z cannot both be H;
wherein R is an alkyl group of 1-6 carbons optionally interrupted by an ether oxygen and optionally substituted with an aryl group; and
$R_f^2$ and $R_f^3$ are each independently selected perfluoroalkyl radicals of 1-4 carbons optionally interrupted by an ether oxygen; and
wherein, when X is N and a is 0:
Y is an electron-withdrawing group $SO_2R_f^6$,
wherein $R_f^6$ is $—(R_f^4 SO_2 N^-(Li^+) SO_2)_m R_f^5$;
m is 0 or 1;
$R_f^4$ is $—C_n F_{2n}$; where n is from 1 to 4; and wherein $R_f^4$ is optionally interrupted by an ether oxygen; and
$R_f^5$ is $—C_n F_{2n+1}$ where each n is 0-4 such as 0, 1, 2, 3, or 4, wherein $R_f^5$ is optionally interrupted by one or more ether oxygens.

These and other embodiments of the present invention will be more apparent when read with the description of the drawings and detailed description that follows.

DETAILED DESCRIPTION OF THE INVENTION

Figure 1:
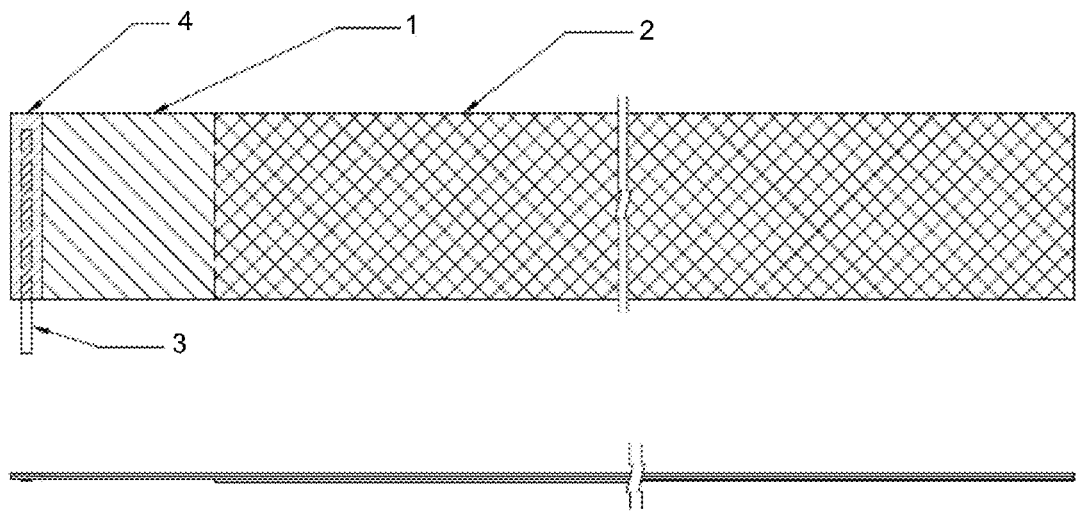
FIG. 1 shows a lithium battery anode in one embodiment of the present invention. The anode material 2 is coated on anode current collector 1. A tab 3 is attached to the current collector and covered by tape 4.

The terms "a," "an," or "the" as used herein not only includes aspects with one member, but also aspects with more than one member. For example, an embodiment including "an aprotic solvent and a polymer" should be understood to present aspects with at least a second aprotic solvent, at least a second polymer, or both.

The term "about" as used herein to modify a numerical value indicates a defined range around that value. If "X" were the value, "about X" would generally indicate a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and provide written description support for a claim limitation of, e.g., "0.98X." When the quantity "X" only includes whole-integer values (e.g., "X carbons"), "about X" indicates from (X−1) to (X+1). In this case, "about X" as used herein specifically indicates at least the values X, X−1, and X+1. When "about" is applied to the beginning of a numerical range, it applies to both ends of the range. Thus, "from about 5 to 20%" is equivalent to "from about 5% to about 20%." When "about" is applied to the first value of a set of values, it applies to all values in that set. Thus, "about 7, 9, or 11%" is equivalent to "about 7%, about 9%, or about 11%."

The term "or" as used herein should in general be construed non-exclusively. For example, an embodiment of "an aprotic solvent or a polymer" would typically present an aspect with a formulation comprising both an aprotic solvent and a polymer. "Or" should, however, be construed to exclude those aspects presented that cannot be combined without contradiction (e.g., an electrolyte pH that is between pH 4 and pH 5 or between pH 5 and pH 6).

The present invention provides several surprising and important benefits over the art of lithium-ion batteries. In the present state of the art, $LiPF_6$ dissolved in an aprotic solvent mixture is typically combined with an aluminum current collector on the cathode side of a ca. 3 volt or higher lithium-ion battery because it represents a good trade-off of several desired attributes which are well known to one of skill in the art.

However, $LiPF_6$ exhibits some drawbacks, as outlined in Fujimoto et al., op. cit. A major drawback of $LiPF_6$ is a lack of thermal stability which seriously limits both the operating temperature of the battery and largely precludes any battery manufacturing process which requires heating the $LiPF_6$ above a temperature of about 100° C. This is a particularly serious limitation in a manufacturing process based upon melt processing the components of a lithium cell such as that described in Doyle et al., U.S. Pat. No. 6,025,092. Another disadvantage of $LiPF_6$ is its tendency to generate hydrofluoric acid (HF) and cause the degradation of electrolyte, positive and negative electrode materials and of the whole battery.

Fujimoto et al., op. cit., propose to replace $LiPF_6$ with $CF_3SO_3^-Li^+$ which provides a remedy to the drawbacks noted therein, and further provides superior thermal stability. A graphite composite current collector, made from graphite powder and a polymeric binder selected from polyethylene, polypropylene, or polyethylene terephthalate is substituted for the standard aluminum because of the corrosiveness of the $CF_3SO_3^-Li^+$ salt. However, as shown herein below, $CF_3SO_3^-Li^+$ causes a catastrophic loss of capacity retention at high discharge rates compared to the $LiPF_6$ systems, thus eliminating batteries based upon $CF_3SO_3^-Li^+$ from any application requiring any but relatively low discharge rates. In one embodiment of the present invention, the imide and methide salts herein described in combination with a protected aluminum or aluminum alloy current collector and one or more corrosion inhibiting additives provide cells of the cycle life superior to the state-of-the-art with especially outstanding long cycle life at high temperature. It is a particularly surprising result that in embodiments of the present invention, very thin and porous conductive carbon coating on the current collector provides strong corrosion protection and either eliminates or drastically decreases the corrosion or aluminum and aluminum alloys. This result was not expected as usually the protective coatings have to be non-porous and thick to provide good protection against crevice and pitting corrosion of the metals. This result is due to a synergetic effect of using together the protective, conductive carbon coatings and corrosion inhibiting additives.

In one embodiment, the electrode composition of the invention is formed into a sheet or film by any suitable method known in the art, and contacted with the current collector to form a laminated structure. The invention provides: a lithium-ion electrochemical cell, the cell comprising:

(i) an anode, the anode comprising an anode active material in electronically conductive contact with an anode current collector, wherein the anode active material is selected from the group consisting of lithium metal, carbon, lithium-intercalated carbon, lithium nitrides, lithium alloys, and lithium-alloy-forming compounds of tin, silicon, antimony, aluminum or titanium oxide;

(ii) a cathode exhibiting an upper charging voltage in the range of 3 to 5 volts with respect to a $Li/Li^+$ reference electrode, the cathode comprising:
a cathode current collector comprising:
aluminum or an aluminum alloy; and
a coating, the coating comprising conductive carbon, graphite, or a mixture thereof;
wherein the coating has a practical thickness of 0.1 to 8 micrometers; wherein the coating has a topography of peaks and valleys; wherein at least some valleys expose an aluminum or aluminum alloy surface; and
a film on the exposed aluminum or aluminum alloy surfaces; and
a cathode active material placed on the top of the coating, the cathode active material comprising a lithium insertion transition metal oxide or phosphate;

(iii) an ion-permeable membrane as a separator between the anode and cathode; and (iv) an electrolyte solution being in ionically conductive contact with the anode and cathode, the electrolyte solution comprising (a) an additive, (b) a lithium compound, and (c) at least one aprotic polar-solvent, a polymer, or a mixture of at least one aprotic polar solvent and a polymer;

the lithium compound being at a concentration from about 0.1 to 3 molar, wherein the lithium compound is $C_2F_5SO_2N^-(Li^+)SO_2C_2F_5$ or $FSO_2N^-(Li^+)SO_2F$; and the additive providing corrosion protection of the cathode current collector, the anode current collector, or both current collectors; wherein the additive is selected from the group consisting of LiBOB, LiF, LiFOB, $LiPF_6$, $LiBF_4$, $LiAsF_6$, $LiClO_4$, and $LiPF_n(R_f)_m$; wherein n+m is 6, and $R_f$ is $CF_3$ or $C_2F_5$; and wherein the additive creates the film on the exposed aluminum or aluminum alloy surfaces of the cathode current collector.

One embodiment of the lithium battery anode of the present invention is shown in FIG. 1. The anode material 2 is coated on anode current collector 1. A tab 3 is attached to the current collector and covered by tape 4.

Figure 2:
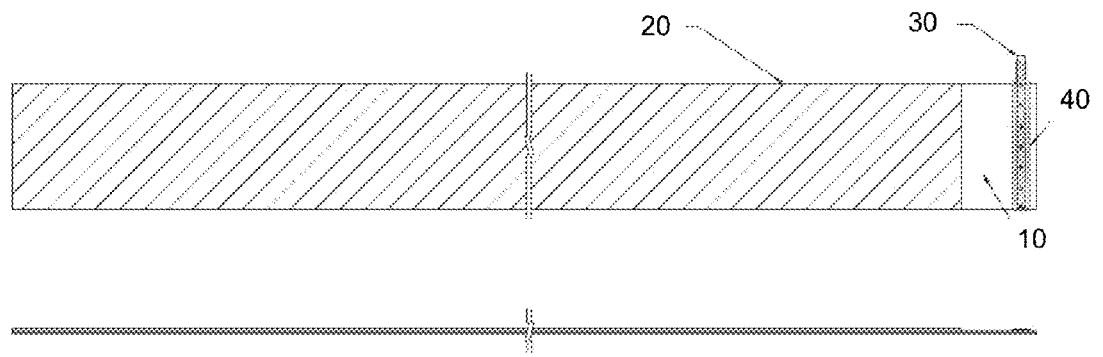
FIG. 2 shows a lithium battery cathode in one embodiment of the present invention. The cathode material 20 is coated on cathode current collector with protective, conductive coating 10. A tab 30 is attached to the current collector and covered by tape 40.

One embodiment of the lithium battery cathode of the present invention is shown in FIG. 2. The cathode material 20 is coated on cathode current collector 10 with protective, conductive coating. A tab 30 is attached to the current collector and covered by tape 40.

Figure 3:
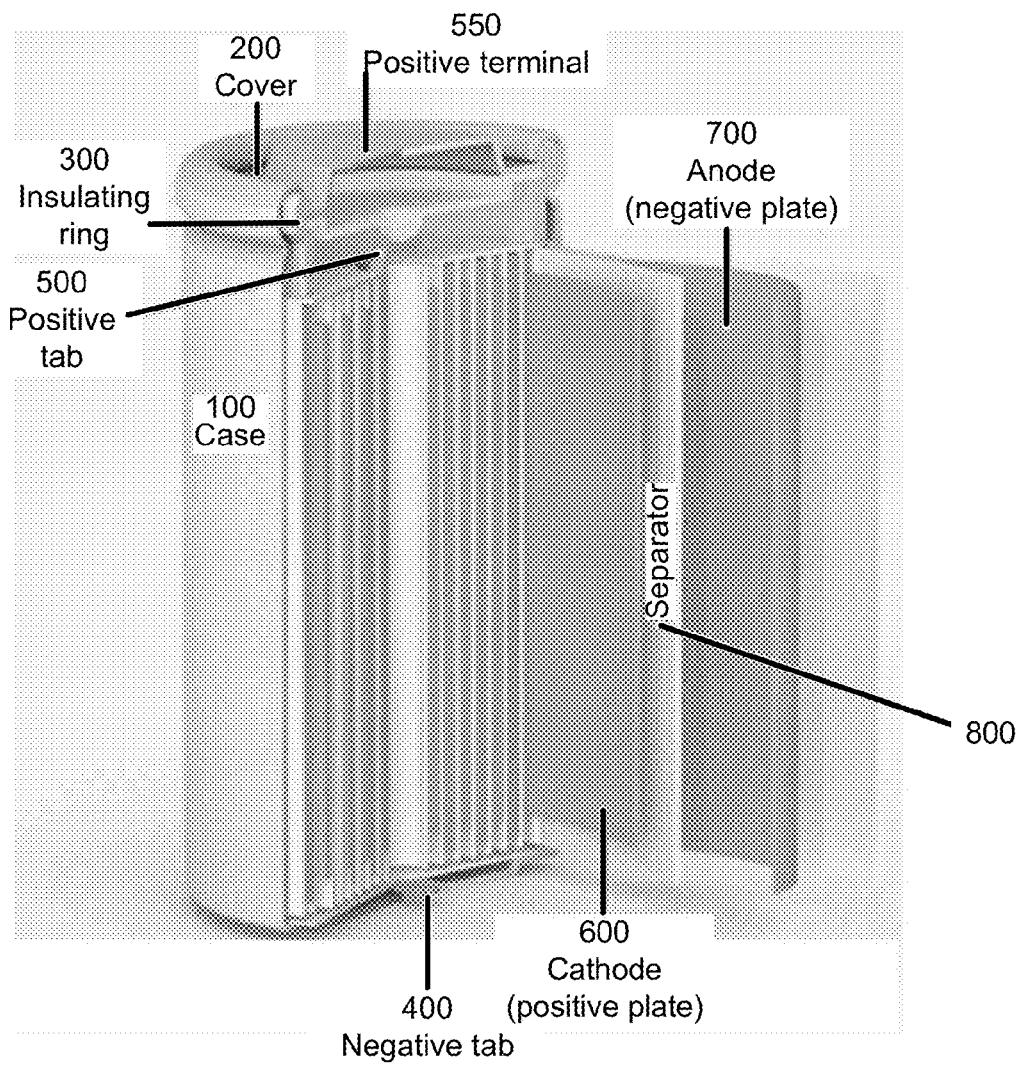
FIG. 3 is a diagram of a cylindrical cell in one embodiment of the present invention.

FIG. 3 is one embodiment of the lithium battery cell of the present invention. As shown therein, a lithium battery cell comprises a case 100, a cover 200, which is the positive terminal, and insulating ring 300 between the case and cover, a negative tab 400 connecting the anode current collector to the can, a positive tab 500 connecting the cathode current collector to the cover, a positive terminal 550, a cathode 600 comprising a cathode active material and a cathode current collector made of aluminum foil with protective, conductive coating, an anode 700 comprising an anode active material, and a copper foil anode current collector, a separator 800, and an electrolyte solution inside the pores of the electrodes and separator, comprising an aprotic solvent and a lithium compound, said electrolyte solution, and said electrodes being in ionically conductive contact with each other, and said lithium compound being represented by the formula

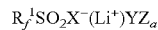

wherein X is C or N, a=0 or 1 with the proviso that a=1 when X is C and a=0 when X is N; wherein when a=1, Y and Z independently are electron-withdrawing groups selected from the group consisting of CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and, H, with the proviso that Y and Z cannot both be H; wherein further $R_f^1$, $R_f^2$ and $R_f^3$ are F or perfluoroalkyl radicals of 1-4 carbons optionally substituted with one or more ether oxygens; R is an alkyl group of 1-6 carbons optionally substituted with one or more ether oxygens, or an aryl group optionally further substituted; or wherein, when a=0, Y is an electron-withdrawing group represented by the formula —$SO_2R_f^6$ where $R_f^6$ is the radical represented by the formula —$(R_f^4SO_2N^-(Li^+)SO_2)_mR_f^5$ where m=0 or 1, and $R_f^4$ is —$C_nF_{2n}$— and $R_f^5$ is —$C_nF_{2n+1}$ where n=0-4 such as 0, 1, 2, 3 or 4, optionally substituted with one or more ether oxygens and an additive that inhibits corrosion of the metal current collector selected from the group containing LiBOB, LiF, LiFOB, $LiPF_6$, $LiPF_nR_{fm}$ where n+m=6 and $R_f$=$CF_3$ or $C_2F_5$, $LiBF_4$, $LiAsF_6$, or $LiClO_4$. A preferred cathode current collector for Li-ion cells is comprised of Al or Al alloy. Additives from the group above act through creating a non-soluble film on the surface of aluminum. Depending on the additive, this film may be comprised of aluminum oxide, aluminum fluoride, aluminum oxalatoborate or other boron compounds or mixture of the compounds.

In some preferred embodiments, the present invention pertains to both lithium and lithium-ion cells. For the purposes of this invention, "lithium cell" refers to a lithium battery having anodes comprising anode active materials such as Li metal and Li metallic alloys, and cathodes comprising active cathode materials whose charge storage and release mechanism involves the insertion and de-insertion of Li ions. The term "lithium-ion cell" refers to a lithium battery having both anode and cathode comprising active electrode materials whose charge storage and release mechanism involves the insertion and de-insertion of Li ions. In a preferred embodiment, this is accomplished by intercalation and de-intercalation in and out of a layered structure.

A preferred anode for use in the practice of the present invention comprises either lithium metal or a mixture of one or more anode active materials (e.g., Li metal or capable of Li alloying/insertion/intercalation and the like) in particulate form, a binder, preferably a polymeric binder, optionally an electron conductive additive, and at least one organic carbonate. Examples of useful anode active materials include, but are not limited to, lithium metal, carbon (graphites, coke-type, mesocarbons, polyacenes, carbon fibers, and the like). Anode-active materials also include lithium-intercalated carbon, lithium metal nitrides such as $Li_{2.6}Co_{0.4}N$, metallic lithium alloys such as LiAl or $Li_4Sn$, lithium-alloy-forming compounds of tin, silicon, antimony, or aluminum such as those disclosed in "Active/Inactive Nanocomposites as Anodes for Li-Ion Batteries," by Mao et al. in *Electrochemical and Solid State Letters*, 2 (1), p. 3, 1999. Further included as anode-active materials are metal oxides such as titanium oxides, iron oxides, or tin oxides. When present in particulate form, the particle size of the anode active material should range from about 0.1 to 100 microns such as 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 90 μm or 100 μm. Preferred anode active materials are graphites such as carbon microbeads, natural graphites, artificial graphites, carbon fibers, or graphitic flake-type materials. Especially preferred are graphite microbeads such as those produced by Osaka Gas in Japan (MCMB 25-28, 10-28, or 6-28). Others include, graphite microbeads, natural graphites, artificial graphites, carbon fibers, graphitic flakes, lithium insertion transition metal oxide, phosphate, or sulfate; or both, (e.g., in a particulate form) and wherein the particulate form ranges from 1 to 100 micrometers in average equivalent spherical diameter.

Suitable conductive additives for the anode composition include carbons such as coke, carbon black, carbon fibers, carbon nanotubes, and natural graphite, metallic flake or particles of copper, stainless steel, nickel or other relatively inert metals, conductive metal oxides such as titanium oxides or ruthenium oxides, or electronically-conductive polymers such as polyaniline or polypyrrole. Preferred are carbon blacks with relatively surface area below ca. 100 m²/g such as Super P and Super S carbon blacks available from MMM Carbon in Belgium.

In fabricating the cell of the invention where the anode active material is in particulate form, the anode may be formed by mixing and forming a composition comprising, by weight, 2-20%, preferably 3-10% of a polymer binder; 10-50%, preferably 14-28% of the electrolyte solution of the invention herein described; 40-80%, preferably 60-70% of electrode-active material; and 0-5%, preferably 1-4% of a conductive additive. Optionally, up to 12% of an inert filler as hereinabove described may also be added, as may such other adjuvants as may be desired by one of skill in the art which do not substantively affect the achievement of the desirable results of some preferred embodiments of the present invention. It is preferred that no inert filler be used.

The cell preferred for the practice of the present invention utilizes cathodes with an upper charging voltage of 3.5-4.5 volts versus a $Li/Li^+$ reference electrode. The upper charging voltage is the maximum voltage that the cathode can be charged at a low rate of charge and with significant reversible storage capacity. However, cells utilizing cathodes with upper charging voltages from 3-5 volts versus a $Li/Li^+$ reference electrode are also suitable. Compositions suitable for use as an electrode-active material in the cathode composition include transition metal oxides, phosphates and sulfates, and lithiated transition metal oxides, phosphates and sulfates. Preferred are oxides such as $LiCoO_2$, spinel $LiMn_2O_4$, chromium-doped spinel lithium manganese oxides $Li_xCr_yMn_2O_4$, layered $LiMnO_2$, $LiNiO_2$, $LiNi_xCo_{1-x}O_2$ where x is $0<x<1$, with a preferred range of $0.5<x<0.95$, $LiNi_{1-x-y}Co_xMn_yO_2$ where x is $0<x<1$, with a preferred range of $0.1<x<0.5$ and where y is $0<y<1$, with a preferred range of $0.1<y<0.5$, and vanadium oxides such as $LiV_2O_5$, $LiV_6O_{13}$, or the foregoing compounds modified in that the compositions thereof are nonstoichiometric, disordered, amorphous, overlithiated, or underlithiated forms such as are known in the art. The suitable cathode-active compounds may be further modified by doping with less than 5% of divalent or trivalent metallic cations such as $Fe^{2+}$, $Ti^{2+}$, $zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$, $Co^{3+}$, or $Mn^{3+}$, and the like. Other cathode active materials suitable for the cathode composition include lithium insertion compounds with olivine structure such as $LiFePO_4$, $LiMnPO_4$ and $LiVPO_4$, and with NASICON structures such as $LiFeTi(SO_4)_3$, or those disclosed by J. B. Goodenough in "*Lithium Ion Batteries*" (Wiley-VCH press, Edited by M. Wasihara and O. Yamamoto). Particle size of the cathode active material from about 1 to 100 microns. Preferred are transition metal oxides such as $LiCoO_2$, $LiMn_2O_4$, $LiNiO_2$, and their derivatives as hereinabove described. $LiCoO_2$ and $LiNi_{1-x-y}Co_xMn_yO_2$ are most preferred.

In forming an electrochemical cell of the invention, a cathode is formed by mixing and forming a composition comprising, by weight, 2-15%, preferably 4-8% of a polymer binder; 10-50%, preferably 15-25% of the electrolyte solution of the invention herein described; 40-85%, preferably 65-75% of an electrode-active material; and 1-12%, preferably 4-8% of a conductive additive. Optionally, up to 12% of an inert filler may also be added, as may such other adjuvants as may be desired by one of skill in the art that do not substantively affect the achievement of the desirable results of the present invention's preferred embodiments. It is preferred that no inert filler be used.

The conductive additives suitable for use in the process of making a cathode are the same as those employed in making the anode as hereinabove described. As in the case of the anode, a highly preferred electron conductive aid is carbon black, particularly one of surface area less than ca. 100 m²/g, most preferably Super P carbon black, available from the MMM S.A. Carbon, Brussels, Belgium.

In a preferred embodiment, graphite is the anode active material and $LiCoO_2$ is the cathode active material, the resulting cell having a cathode with an upper charging voltage of approximately 4.2 V versus a $Li/Li^+$ reference electrode.

A Li-ion cell preferred for the present invention may be assembled according to any method known in the art. In a first method in the art, exemplified by Nagamine et al. in U.S. Pat. No. 5,246,796, electrodes are solvent-cast onto current collectors, the collector/electrode tapes are spirally wound along with microporous polyolefin separator films to make a cylindrical roll, the winding placed into a metallic cell case, and the nonaqueous electrolyte solution impregnated into the wound cell. In a second method in the art, exemplified by Oliver et al. in U.S. Pat. No. 5,688,293 and Venuogopal et al. in U.S. Pat. No. 5,837,015, electrodes are solvent-cast onto current collectors and dried, the electrolyte and a polymeric gelling agent are coated onto the separators and/or the electrodes, the separators are laminated to, or brought in contact with, the collector/electrode tapes to make a cell subassembly, the cell subassemblies are then cut and stacked, or folded, or wound, then placed into a foil-laminate package, and finally heat treated to gel the electrolyte. In a third method in the art provided by Gozdz et al. in U.S. Pat. No. 5,456,000 and U.S. Pat. No. 5,540,741, electrodes and separators are solvent cast with also the addition of a plasticizer; the electrodes, mesh current collectors, electrodes and separators are laminated together to make a cell subassembly, the plasticizer is extracted using a volatile solvent, the subassembly is dried, then by contacting the subassembly with electrolyte the void space left by extraction of the plasticizer is filled with electrolyte to yield an activated cell, the subassembly(s) are optionally stacked, folded, or wound, and finally the cell is packaged in a foil laminate package. In a fourth method in the art, the electrode and separator materials are dried first, then combined with the salt and electrolyte solvent to make active compositions; by melt processing the electrodes and separator compositions are formed into films, the films are laminated to produce a cell subassembly, the subassembly(s) are stacked, folded, or wound and then packaged in a foil-laminate container. The third and fourth methods are exemplified in the specific embodiments of the present invention described below.

In preferred embodiments, the cathode current collector suitable for a lithium or lithium-ion battery of the present invention is made of or comprises aluminum or an aluminum alloy such as alloy 1100. In a preferred embodiment, the aluminum is essentially pure aluminum with a minimum 99% aluminum content. In other aspects, the cathode current collector comprises at least 80% aluminum, such as 81%, 82%, 83%, 84%, 85%, 86%, 87%, 88%, 89%, 90%, 91%, 92%, 93%, 94%, 95%, 96%, 97%, 98%, 99% or even 100% aluminum.

The cathode current collector has a protective, conductive coating on its surface. The function of this protective, conductive coating is to fully or partially shield the aluminum from contact with the electrolyte. The coating has to be electronically conductive to allow the current to flow through it from the current collector to the active cathode material and back. Suitable protective, conductive coatings include, carbon, graphite or a mixture of carbon, graphite and optionally a polymer. In certain aspects, the conductive coatings include one or more of carbon, graphite and polymer. In certain aspects, the protective, conductive coating is substantially pure carbon or graphite. The coating is typically less than 10 μm.

In one embodiment, the protective, conductive coating is comprised of conductive carbon and a polymer to allow for good mechanical properties of the coating and good adhesion of the coating to the surface of the metal foil. Various polymers can be used, such as acrylates, polyimides, polytereph-thalates, and others. Polymer should preferably be insoluble and either not swell or swell insignificantly in the lithium-ion battery electrolyte.

The mixture of the conductive carbon and a polymer can be coated on a surface of the current collector by any method familiar to one skilled in the art, such as blade-over-roll coating method, reverse roll comma coating, spray coating, sponge coating, print coating, or gravure coating. The thickness of the coating in this embodiment is from 0.1 μm to 10 μm. The mixture of the conductive carbon and a polymer can be made by dispersing the polymer and the carbon in appropriate solvent, such as water or N-methylpyrrolidinium. Alternatively, the mixtures to produce conductive coatings are available commercially, for example, from Henkel, Inc, under the brand names DAG EB-012, EB-815, DAG 112, and others.

In one embodiment, to improve the corrosion protection properties of the coating, the current collector with a coating it is exposed to high temperature for a period of time to allow the polymers to crosslink. That results in a coating more resistant to dissolution or swelling.

In some embodiments, the conductive coating is coated on a current collector with a skip to allow automatic assembly equipment to detect the end of the coating and allow to weld the tab to the current collector without obstruction of conductive coating. The skip area may be protected later against corrosion by means of adhesive tape.

In other embodiments, conductive coating comprises pure carbon or graphite applied to the surface of the current collector using various methods, for example, a vacuum vapor deposition technique. The thickness of the coating in this embodiment can be as little as 10 nm.

Strictly speaking, the operability of some embodiments of the present invention does not require the incorporation of a binder into anode or cathode material. However, it is preferred in the art to employ a binder, particularly a polymeric binder, and it is preferred in the practice of the present invention as well. One skilled in the art will appreciate that many of the polymeric materials recited below as suitable for use as binders will also be useful for forming ion-permeable separator membranes suitable for use in the lithium or lithium-ion battery of the invention.

Suitable binders include, but are not limited to, polymeric binders, particularly gelled polymer electrolytes comprising polyacrylonitrile, poly(methylmethacrylate), poly(vinyl chloride), polyacrylic acid and polyvinylidene fluoride and copolymers thereof. Also included are styrene butadiene rubber (SBR) and carboxymethyl cellulose or sodium salts of carboxymethyl cellulose. Also included are solid polymer electrolytes, such as polyether-salt based electrolytes including poly(ethylene oxide) (PEO) and its derivatives, polypropylene oxide) (PPO) and its derivatives, and poly(organophosphazenes) with ethyleneoxy or other side groups. Other suitable binders include fluorinated ionomers comprising partially or fully fluorinated polymer backbones, and having pendant groups comprising fluorinated sulfonate, imide, or methide lithium salts. Preferred binders include polyvinylidene fluoride and copolymers thereof with hexafluoropropylene, tetrafluoroethylene, fluorovinyl ethers, such as perfluoromethyl, perfluoroethyl, or perfluoropropyl vinyl ethers; and ionomers comprising monomer units of polyvinylidene fluoride and monomer units comprising pendant groups comprising fluorinated carboxylate, sulfonate, imide, or methide lithium salts.

In the electrode suitable for use in the practice of the invention, the most preferred binders are polyvinylidene fluoride (PVDF) or a copolymer of polyvinylidene fluoride and hexafluoropropylene (p(VdF-HFP)) such as that available commercially under the trade name KYNAR FLEX® available from Elf Atochem North America, Philadelphia, Pa.

Gelled polymer electrolytes are formed by combining the polymeric binder with a compatible suitable aprotic polar solvent and, where applicable, the electrolyte salt.

PEO and PPO-based polymeric binders can be used without solvents. Without solvents, they become solid polymer electrolytes which may offer advantages in safety and cycle life under some circumstances.

Other suitable binders include so-called "salt-in-polymer" compositions comprising polymers having greater than 50% by weight of one or more salts. See, for example, M. Forsyth et al, *Solid State Ionics*, 113, pp 161-163 (1998).

Also included as binders are glassy solid polymer electrolytes which are similar to the "salt-in-polymer" compositions except that the polymer is present in use at a temperature below its glass transition temperature and the salt concentrations are ca. 30% by weight.

Preferably, the volume fraction of the preferred binder in the finished electrode is between 2 and 40%.

Preferred electrolyte solvents are aprotic liquids or polymers. In some preferred embodiments, organic carbonates, such as those known in the art for use in Li-ion batteries, are suitable for the practice of the present invention. Organic carbonates include propylene carbonate, dimethyl carbonate, ethylene carbonate, diethyl carbonate, ethyl methyl carbonate and many related species. Also included are solid polymer electrolytes such as polyethers and poly(organo phosphazenes). Further included are lithium salt-containing ionic liquid mixtures such as are known in the art, including ionic liquids such as organic derivatives of the imidazolium, pyrrolidinium and other cations with counterions based on imides, methides, $PF_6^-$, or $BF_4^-$. See for example D. R. MacFarlane et al., *Nature*, 402, 792 (1999).

Mixtures of suitable electrolyte solvents, including mixtures of liquid and polymeric electrolyte solvents, are also suitable. Preferred electrolyte solvents are organic carbonates. Most preferred are mixtures of ethylene carbonate and dimethyl carbonate, ethylene carbonate and propylene carbonate, or ethylene carbonate, propylene carbonate, and diethyl carbonate.

Further useful electrolytes include for example, the following embodiments: 1) liquid electrolytes such as a Li salt and aprotic solvent; 2) gel electrolytes such as a Li salt and aprotic solvent and polymer; and 3) solid electrolytes such as a Li salt and polymer. Preferably, the electrolyte comprises an additive and a lithium compound and one or both of the following: i) an aprotic solvent and ii) a polymer.

The electrolyte solution suitable for the practice of the invention is formed by combining the lithium imide or methide salt herein described with an additive that suppresses the corrosion of the aluminum current collector. The additive is selected from a group including LiBOB, LiF, LiFOB, $LiPF_6$, $LiPF_nR_{fm}$ where n+m=6 and $R_f$=$CF_3$ or $C_2F_5$, $LiBF_4$, $LiAsF_6$, or $LiClO_4$, and is introduced into electrolyte solvent by dissolving, slurrying or melt mixing as appropriate to the particular materials. Other boron and fluoride containing aluminum corrosion inhibitors can be used as well. In preferred embodiments, the present invention is operable when the concentration of the imide or methide salt is in the range of 0.1 to up to 3 molar, with 0.2 to 1.2 molar most preferred. The concentration of the corrosion inhibiting additive is from but 0.01 to 1 molar is preferred, and from 0.05 to 0.8 molar most preferred. Depending on the fabrication method of the cell, the electrolyte solution may be added to the cell after winding or lamination to form the cell structure, or it may be introduced into the electrode or separator compositions before the final cell assembly.

The separator suitable for some preferred embodiments of the lithium or lithium-ion battery of the present invention is any ion-permeable shaped article, preferably in the form of a thin film or sheet. Such separator may be a microporous film such as a microporous polypropylene, polyethylene, polytetrafluoroethylene and layered structures thereof. Suitable separators also include swellable polymers such as polyvinylidene fluoride and copolymers thereof. Other suitable separators include those known in the art including gelled polymer electrolytes such as poly(methyl methacrylate) and poly(vinyl chloride). Also suitable are polyethers such as poly(ethylene oxide) and poly(propylene oxide). Preferable are microporous polyolefin separators, separators comprising copolymers of vinylidene fluoride with hexafluoropropylene, perfluoromethyl vinyl ether, perfluoroethyl vinyl ether, or perfluoropropyl vinyl ether, including combinations thereof, or fluorinated ionomers, such as those described in Doyle et al., U.S. Pat. No. 6,025,092, an ionomer comprising a backbone of monomer units derived from vinylidene fluoride and a perfluoroalkenyl monomer having an ionic pendant group represented by the formula:

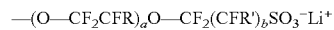
—(O—CF$_2$CFR)$_a$O—CF$_2$(CFR')$_b$SO$_3^-$Li$^+$ wherein R and R' are independently selected from F, Cl or a perfluorinated alkyl group having 1 to 10 carbon atoms, a=0, 1 or 2, b=0 to 6, and the imide and methide derivatives thereof as described in Feiring et al., WO 9945048(A1).

The electrode of the invention may conveniently be made by dissolution of all polymeric components into a common solvent and mixing together with the carbon black particles and electrode active particles. For example, a preferred lithium battery electrode can be fabricated by dissolving PVDF in 1-methyl-2-pyrrolidinone or p(VdF-HFP) copolymer in acetone solvent, followed by addition of particles of electrode active material and carbon black, followed by deposition of a film on a substrate and drying. The resultant preferred electrode will comprise electrode active material, conductive carbon black, and polymer. This electrode can then be cast from solution onto a suitable support such as a glass plate or a current collector, and formed into a film using techniques well-known in the art.

In some preferred embodiments, the conductive coating on the cathode current collector provides advantages in achieving low contact resistance between the active cathode material and the current collector. It also improves stability in the impedance of the battery over time.

In some preferred embodiments of the present invention, the anode active material is brought into electronically conductive contact with an anode current collector which is preferably a metal foil or mesh, most preferably copper. As in the case of the cathode, it may be advantageous to employ an adhesion promoter there-between. Of course for optimum operation, it is desirable to minimize the contact resistance between anode and anode current collector following the practices of the art.

In one embodiment, the electrode films thus produced are then combined by lamination with the separator. In order to ensure that the components so laminated or otherwise combined are in excellent ionically conductive contact with one another, the components are combined with an electrolyte solution comprising an aprotic solvent, preferably an organic carbonate as hereinabove described, and a lithium imide or methide salt represented by the formula

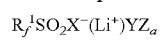
$R_f$SO$_2$X$^-$(Li$^+$)YZ$_a$ wherein X is C or N, a=0 or 1 with the proviso that a=1 when X is C and a=0 when X is N;

wherein when a=1, Y and Z independently are electron-withdrawing groups selected from the group consisting of CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and, H, with the proviso that Y and Z cannot both be H; wherein further $R_f^1$, $R_f^2$ and $R_f^3$ are F or perfluoroalkyl radicals of 1-4 carbons optionally substituted with one or more ether oxygens; R is an alkyl group of 1-6 carbons optionally substituted with one or more ether oxygens, or an aryl group optionally further substituted; or wherein, when a=0, Y is an electron-withdrawing group represented by the formula $—SO_2R_f^6$ where $R_f^6$ is the radical represented by the formula $—(R_f^4SO_2N^-(Li^+)SO_2)_mR_f^5$ where m=0 or 1, and $R_f^4$ is $—C_nF_{2n}—$ and $R_f^5$ is $—C_nF_{2n+1}$ where n=0-4 such as 0, 1, 2, 3 or 4, optionally substituted with one or more ether oxygens. Preferably, X is N, m=0, and $R_f^1$ and $R_f^5$ are $—CF_3$, F or $C_2F_5$. In one instance, the electrolyte solution is $C_2F_5SO_2N^-(Li^+)SO_2C_2F_5$, $FSO_2N^-(Li^+)SO_2F$ or a combination thereof.

The means by which the layers comprising a complete cell or battery of some embodiments of the present invention are assembled into the final working battery or cell are not critical. One skilled in the art will appreciate that a wide diversity of methods for assembling batteries, including lithium and lithium-ion batteries have been disclosed in the art and are outlined above. For the purposes of some preferred embodiments of the present invention, any such method which is compatible with the particular chemical and mechanical requisites of a given embodiment of the present environment is suitable.

One method is the method of Gozdz et al. in U.S. Pat. Nos. 5,456,000 and 5,540,741, a plasticized composition is cast and formed, the plasticizer extracted and the electrolyte added to the dry cell structure. Another method is to fabricate a cell comprising the graphite foil and imide or methide salt wherein the activated electrode material is melt processed, most preferably by continuous extrusion, into the form of a sheet and is laminated to the other components of the battery in a single continuous operation.

The present invention is further described in the following specific embodiments which are intended merely as representative of some preferred embodiments of the present invention.

EXAMPLES

In the following test examples, conductive coatings were applied to the aluminum current collector.

The samples were tested for the corrosion by cyclic voltammetry. Cyclic voltammetry is a good measure and is often used to assess short term corrosion resistance of a material. In this test, the sample of the current collector, bare or coated, was submerged in electrolyte and the potential was swept from open circuit potential to 4.2V vs Li reference electrode. Sweep rate of 10 mV/sec. Rise of current on the back sweep (from more positive potential to more negative potential) indicate material corrosion.

A potential hold test at 60° C. was employed as a measure of long term corrosion resistance of the current collector. In this test, the sample of the current collector, bare or coated, was submerged in electrolyte and the potential was set to 4.2V vs Li reference electrode. Current was recorded. High current indicates corrosion. After the test the samples were investigated visually and under a microscope.

The following examples describe and explain how synergy of conductive protective coating and corrosion inhibiting additives results in possibility of using thermally stable salts described herein to achieve long battery cycle life with little degradation.

Example 1

1M solution of LiTFSI was prepared in a mixture of EC:D-MC:EMC 1:1:1 weight ratio. The solvents and salts were pre-dried. The moisture level of the solution was below 50 ppm.

A sample of bare aluminum, aluminum coated with EB-012 conductive coating and EB-815 conductive coatings.

EB-815 was coated on aluminum foil using a reverse-roll comma coater. Aluminum Alloy 1235/1145-H18 of 18 µm thickness was used (manufactured by All Foils, Inc). The EB-815 conductive primer (manufactured by Henkel Corporation) was diluted by weight percent with NMP; 47% EB-815 and 53% NMP. The diluted mix was stirred for 3 hours before coating.

Coating speed was set at 7 meters per minute. Comma bar gap was set at 65 µm. Drying after coating was done in 3 consecutive zones of 6 foot length ovens. The ovens were set to 100° C., 120° C., and 150° C. After coating and in-process drying was completed, the foil was cured on the roll by heating inside an oven. The curing included 15 minutes at 150° C. followed by 15 minutes at 270° C.

Thickness of coated foil was measured with an electronic micrometer. As coated the thickness measurement was 22-24 µm. Area deposition loading (g/m²) of conductive primer coating was measured by punching coupons out of the bare foil and out of the coated foil. Calculations were made to determine area loading of bare foil versus area loading of coating foil. The two numbers are subtracted to find area deposition of conductive primer coating. Area deposition loading of EB-815 was calculated to be 1.5 g/m²/side (3.0 g/m²/2-sides).

Due to the uneven surface of primer coating the as-coated measureable thickness is higher than the "practical thickness" of the coated foil. The cross section of coated foil surface has the topography if peaks and valleys with a peak to valley differential of 1-5 µm. The practical thickness is realized after coating with the active material and compression of the coated electrode. Active material fills in the valleys of the coated foil topography. In this way, the practical thickness of primed foil is thinner than the measurable thickness.

The practical thickness can be calculated by using the estimated density of the conductive primer coating and the area deposition. The density of the conductive primer was estimated at 1.8-2.0 g/cc (major composition is conductive graphite with small amount of proprietary binder material). By dividing the Area deposition by estimated density a practical thickness of primer is estimated to be 1.5 µm to 1.7 µm for 2-sided coating (0.75 µm to 0.85 µm for 1-sided coating). Therefore, total practical thickness of the 2-side primer coated foil was estimated to be between 19.5 µm to 19.7 µm thickness (18 µm bare Aluminum foil thickness+2-side primer coating estimated practical thickness). It was also observed that the thickness of the primed foil was measured at 20-22 µm after compression using calendar rolls.

EB-012 was coated on aluminum foil using a reverse-roll comma coater. Aluminum Alloy 1235/1145-H18 of 18 µm thickness was used (manufactured by All Foils, Inc). The EB-012 conductive primer (manufactured by Henkel Corporation) was diluted by weight percent with DI water; 75% EB-012 and 25% DI water. The diluted mix was stirred for 3 hours before coating.

Coating speed was set at 2 meters per minute. Comma bar gap was set at 65 µm. Drying after coating was done in 3 consecutive zones of 6 foot length ovens. The ovens were set to 60° C., 70° C., and 110° C. After coating and in-process drying was completed, the foil did not require any further heat treatment for curing.

Thickness of coated foil was measured with an electronic micrometer. As coated the thickness measurement was 30-36 µm. Area deposition loading ($g/m^2$) of conductive primer coating was measured by punching coupons out of the bare foil and out of the coated foil. Calculations were made to determine area loading of bare foil versus area loading of coating foil. The two numbers are subtracted to find area deposition of conductive primer coating. Area deposition loading of EB-012 was calculated to be 0.29 $g/m^2$/side (0.58 $g/m^2$/2-sides).

Due to the uneven surface of primer coating the as-coated measureable thickness is higher than the "practical thickness" of the coated foil. The cross section of coated foil surface has the topography if peaks and valleys with a peak to valley differential of 2-10 µm. The practical thickness is realized after coating with the active material and compression of the coated electrode. Active material fills in the valleys of the coated foil topography. In this way, the practical thickness of primed foil is thinner than the measurable thickness.

The practical thickness can be calculated by using the estimated density of the conductive primer coating and the area deposition. The density of the conductive primer was estimated at 1.8-2.0 g/cc (major composition is conductive graphite with small amount of proprietary binder material). By dividing the Area deposition by estimated density a practical thickness of primer is estimated to be 2.9 µm to 3.2 µm for 2-sided coating (1.5 µm to 1.6 µm for 1-sided coating). Therefore, total practical thickness of the 2-side primer coated foil was estimated to be between 20.9 µm to 21.2 µm thickness (18 µm bare Aluminum foil thickness+2-side primer coating estimated practical thickness). It was also observed that the thickness of the primed foil was measured at 22-24 µm after compression using calendar rolls.

Figure 4:
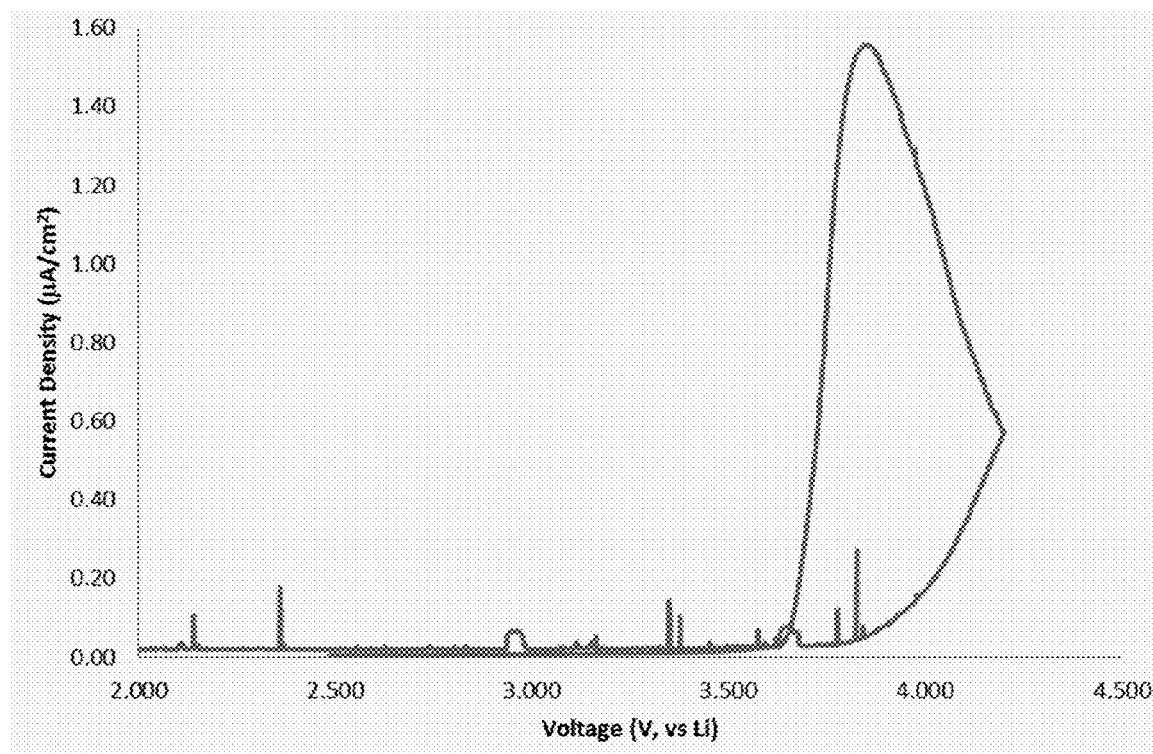
FIG. 4 is a graph showing a cyclic voltammogram of bare aluminum in electrolyte as described in Example 1.

CV test showed that bare aluminum corrodes readily as shown on FIG. 4. Samples of Al foil coated with EB-012 and EB-815 did not show corrosion on CV test, however, all the samples corroded within hours on potential hold test.

This example demonstrates that the protective, conductive carbon coating by itself is not sufficient to prevent corrosion of aluminum current collector.

Example 2

1M solution of LiTFSI was prepared in a mixture of EC:DMC:EMC 1:1:1 weight ratio as in Test Example 1. One percent of LiBOB was added to the electrolyte solution.

Figure 5:
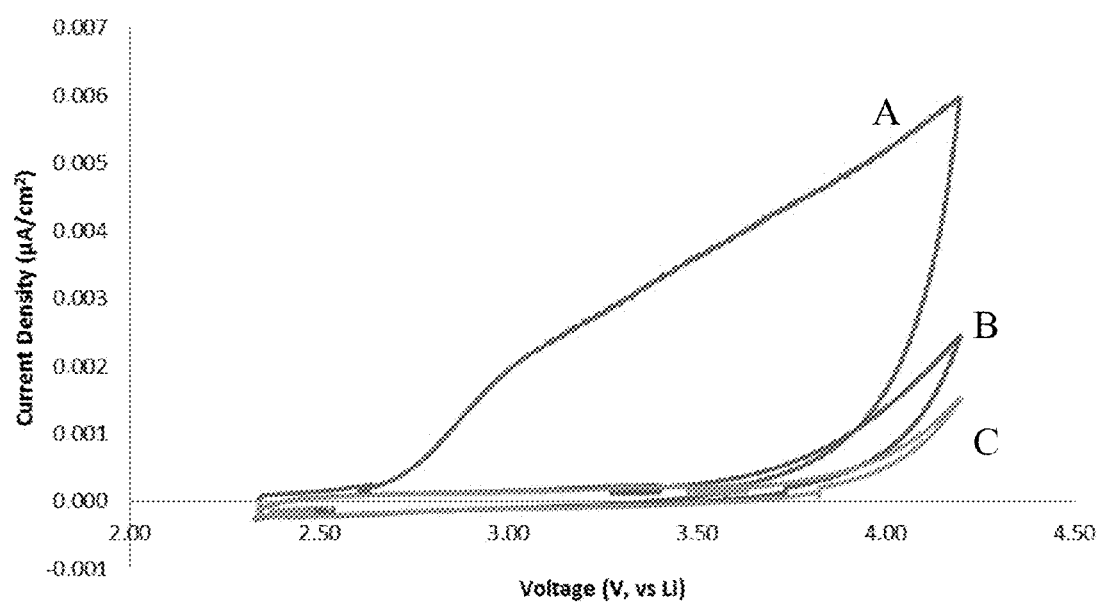
FIG. 5 is a graph showing a cyclic voltammogram of bare aluminum in electrolyte as described in Example 2: A—Sweep 1; B—Sweep 2; C—Sweep 3.
Figure 6:
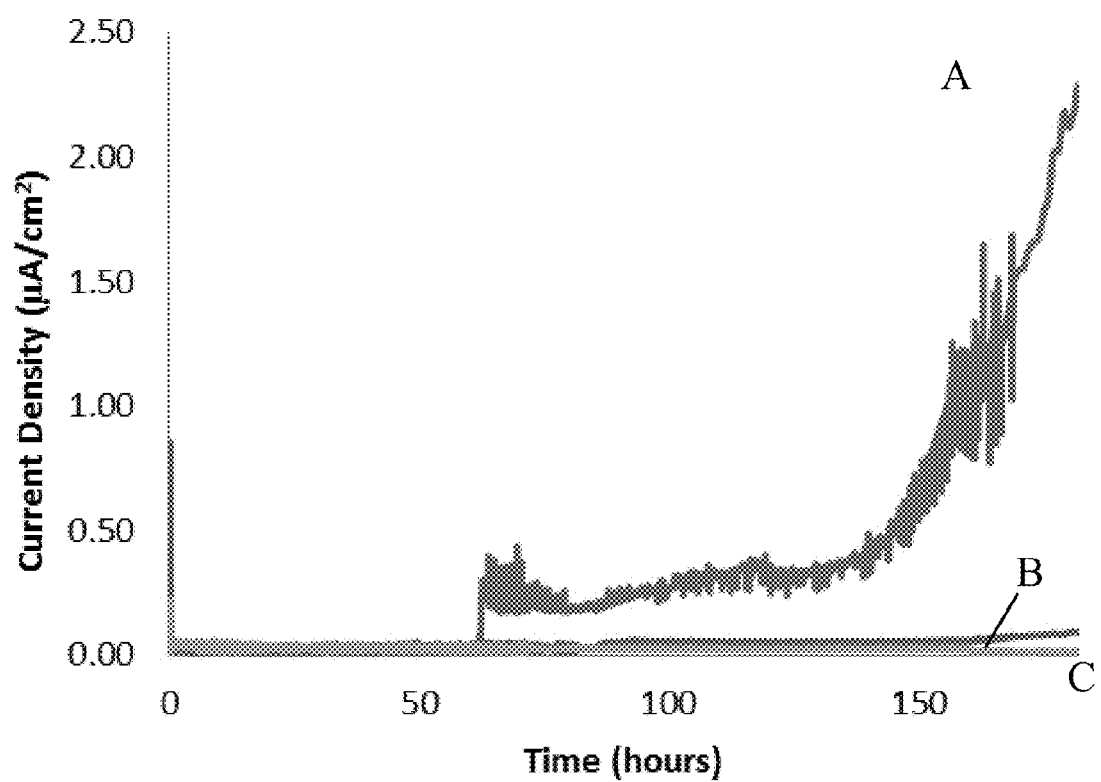
FIG. 6 is a graph showing the potential hold test of samples as described in Example 2. A—bare Al; B—EB-012 coating; C—EB-815 coating.

CV test shows that the corrosion of the bare aluminum was suppressed (FIG. 5: (A—Sweep 1; B—Sweep 2; C—Sweep 3). However, potential hold test shows that the corrosion of the bare aluminum started in about 60 hours from the beginning of the test (FIG. 6: (A—bare Al; B—EB-012 coating; C—EB-815 coating). The corrosion of the protected samples did not occur with the whole duration of the test (one week). This surprising finding shows that synergetic effect of using the protective coating and the corrosion inhibiting additive allows reduction or prevention of corrosion of the current collector corrosion.

Absence on corrosion at 60° C. potential hold test described in this example translates into months and years of corrosion-free storage of the of battery at lower temperatures utilizing this protective, conductive coating and the corrosion inhibitor.

Example 3

0.95M solution of LiTFSI was prepared in a mixture of EC:DMC:EMC 1:1:1 weight ratio as in Test Example 1. 0.05M of $LiPF_6$ was added to the electrolyte solution.

Figure 7:
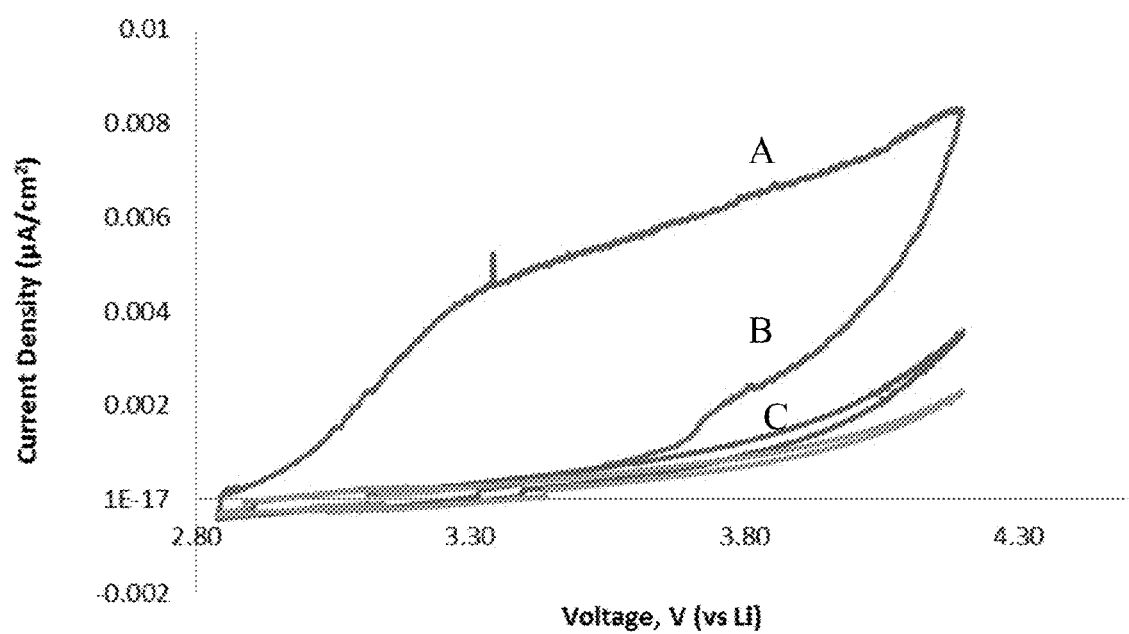
FIG. 7 is a graph showing a cyclic voltammogram of bare aluminum in electrolyte as described in Example 3: A—Sweep 1; B—Sweep 2; C—Sweep 3.
Figure 8:
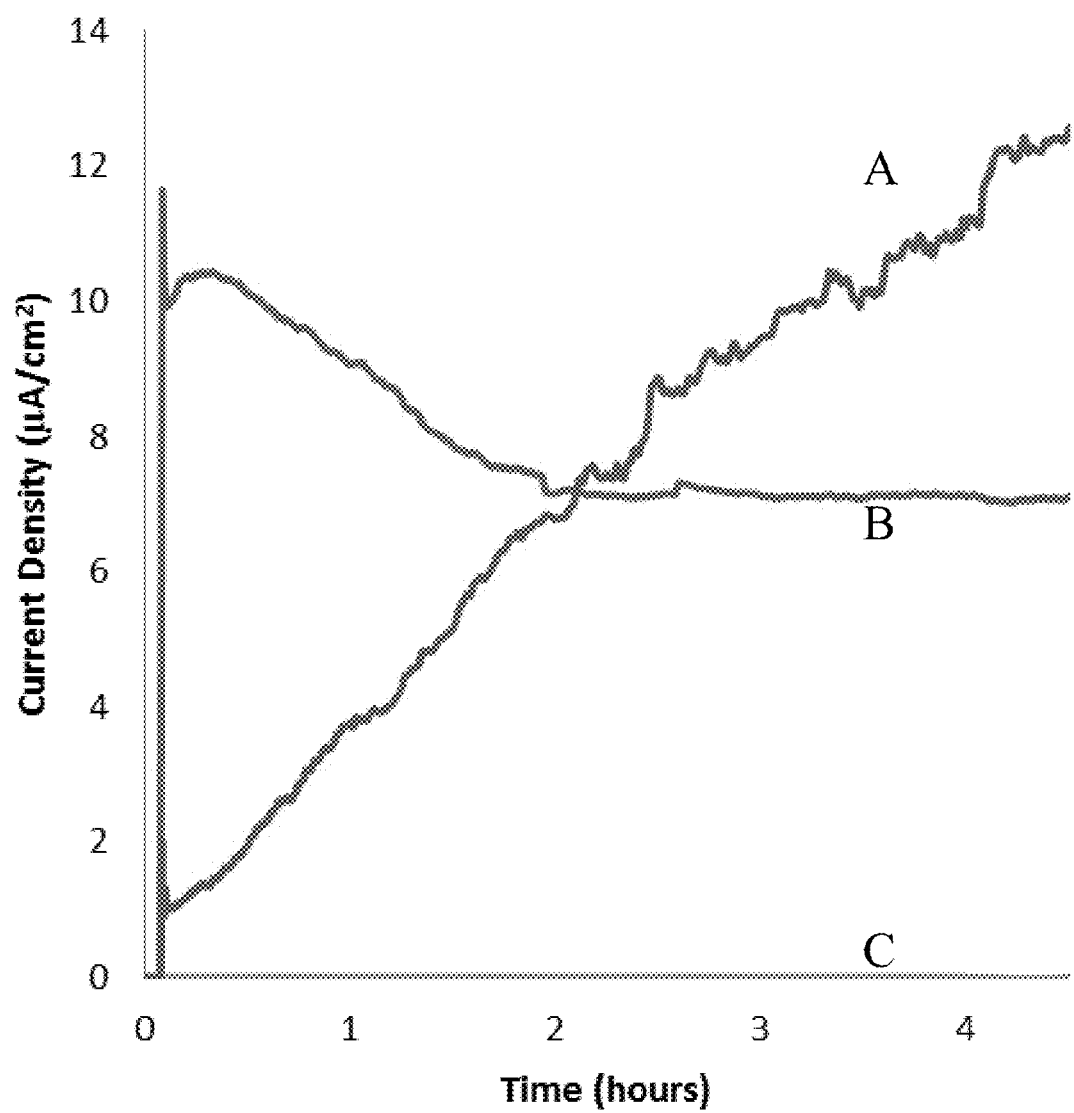
FIG. 8 is a graph showing the potential hold test of samples described in Example 3. A—bare Al; B—EB-012 coating; C—EB-815 coating.

CV test shows that the corrosion of the bare aluminum was suppressed (FIG. 7: (A—Sweep 1; B—Sweep 2; C—Sweep 3). Potential hold test shows that the corrosion of the bare aluminum started almost immediately (FIG. 8: A—bare Al; B—EB-012; C—EB-815). The corrosion of the sample coated with EB-012 conductive coating was slower, while the corrosion of sample coated with EB-815 was delayed significantly. This example demonstrates that some corrosion inhibiting additives are preferred to other: the LiBOB additive uses in Test Example 2 is more effective than $LiPF_6$ additive shown in Test Example 3. It also demonstrates that some protective, conductive coatings are preferred to others. In this case, EB-815 protects aluminum more effectively than EB-012.

Example 4

0.8M solution of LiTFSI was prepared in a mixture of EC:DMC:EMC 1:1:1 weight ratio as in Test Example 1. 0.2M of $LiPF_6$ was added to the electrolyte solution.

Figure 9:
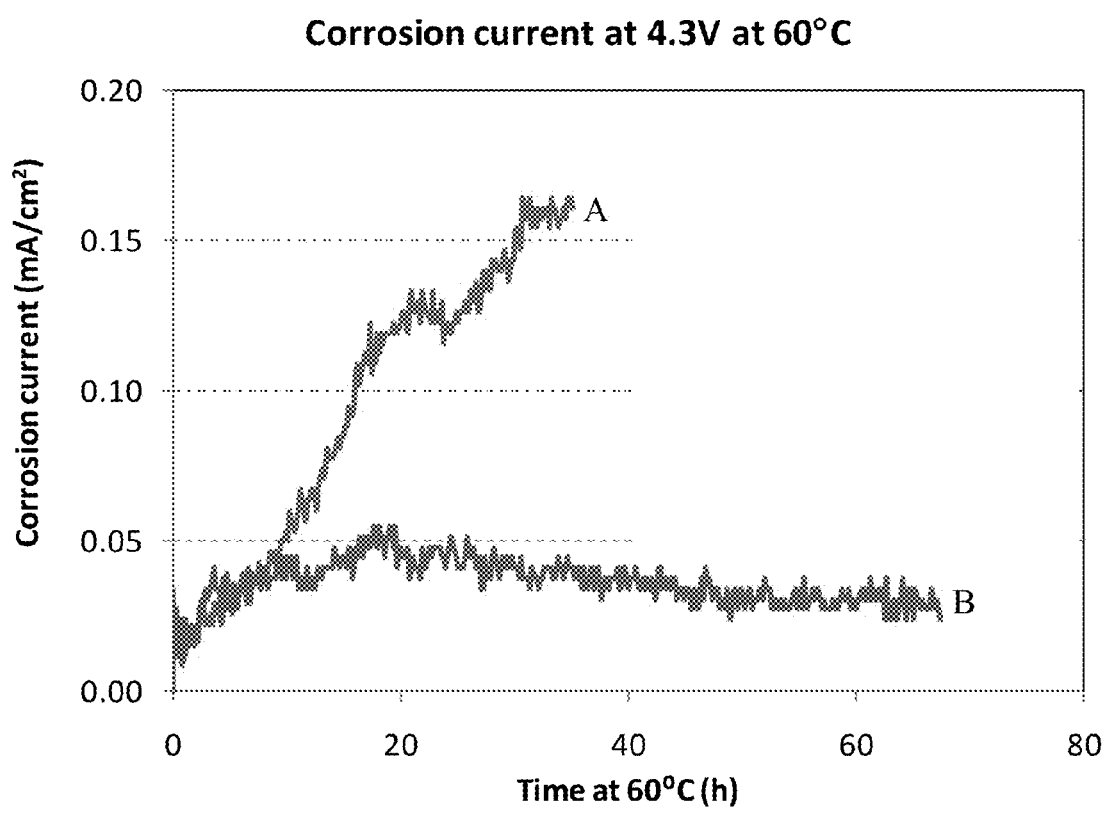
FIG. 9 is a graph showing the potential hold test of samples as described in Example 4. A—bare Al; B—EB-012 coating.

Increase in the amount of corrosion inhibiting additive resulted in EB-012 coating being able to suppress the corrosion on the potential hold test (FIG. 9: A—bare Al; B—EB-012). In certain aspects, the degree of corrosion protection depends on both the type of coating and on the type and amount of additive.

One skilled in the art can further test and select these and other protective, conductive coatings together with appropriate amount of effective corrosion inhibitors to fully suppress aluminum corrosion and make a battery with salts described herein to achieve long cycle life with little degradation.

Example 5

0.8M solution of LiTFSI was prepared in a mixture of EC:DMC:EMC 1:1:1 weight ratio as in Test Example 1. 0.2M of $LiPF_6$ was added to the electrolyte solution.

Figure 10:
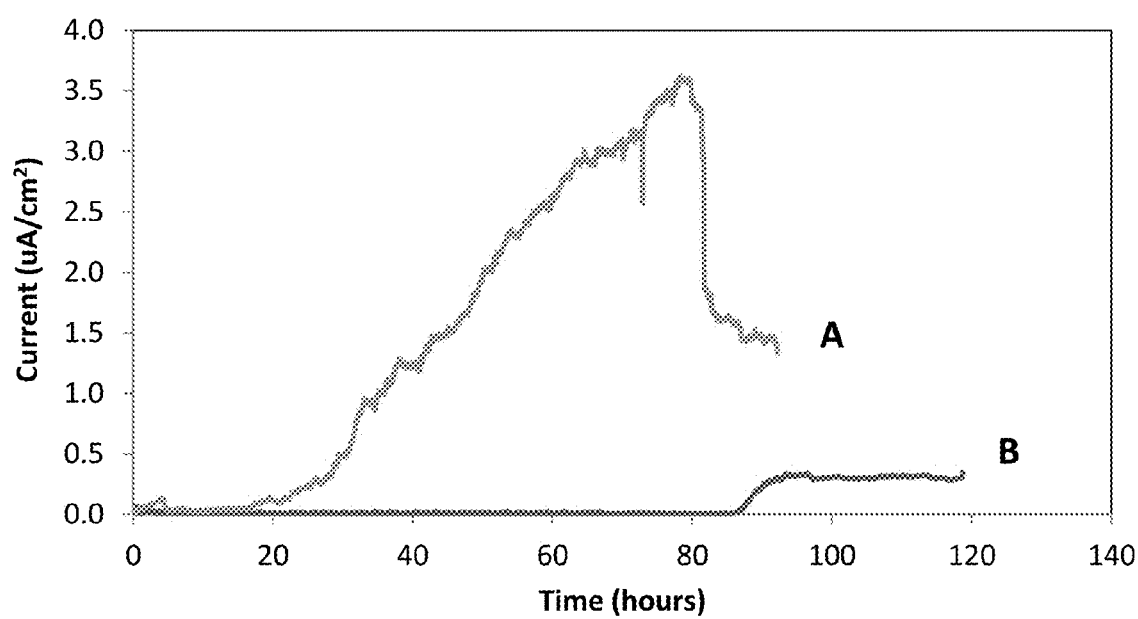
FIG. 10 is a graph showing bare aluminum tested on the potential hold test at 60° C. at two different voltages: A—at 4.2V and B—at 3.65V. At 4.2V corrosion started almost immediately and significantly accelerated within 30 hours, whereas in the case of 3.65V, the corrosion onset was significantly delayed.

Bare aluminum was tested on the potential hold test at 60° C. at two different voltages: A—at 4.2V and B—at 3.65V (FIG. 10). At 4.2V corrosion started almost immediately and significantly accelerated within 30 hours, in case of 3.65V potential hold voltage, the corrosion onset was significantly delayed.

This example shows that lowering the voltage of the battery will further slowdown corrosion of the current collector. Use of lower voltage cathode material such as, for example, lithium iron phosphate, benefits corrosion protection of aluminum achieved through conductive protective coating. Decreasing the charging voltage of the Li-ion cells utilizing other cathode materials also improves the corrosion of aluminum, however, at some expense of the cell's available capacity and energy.

Example 6

The following example describes how to make an embodiment battery of this invention: a Li-ion battery that has long cycle life at ambient temperature and high temperature.

Figure 11:
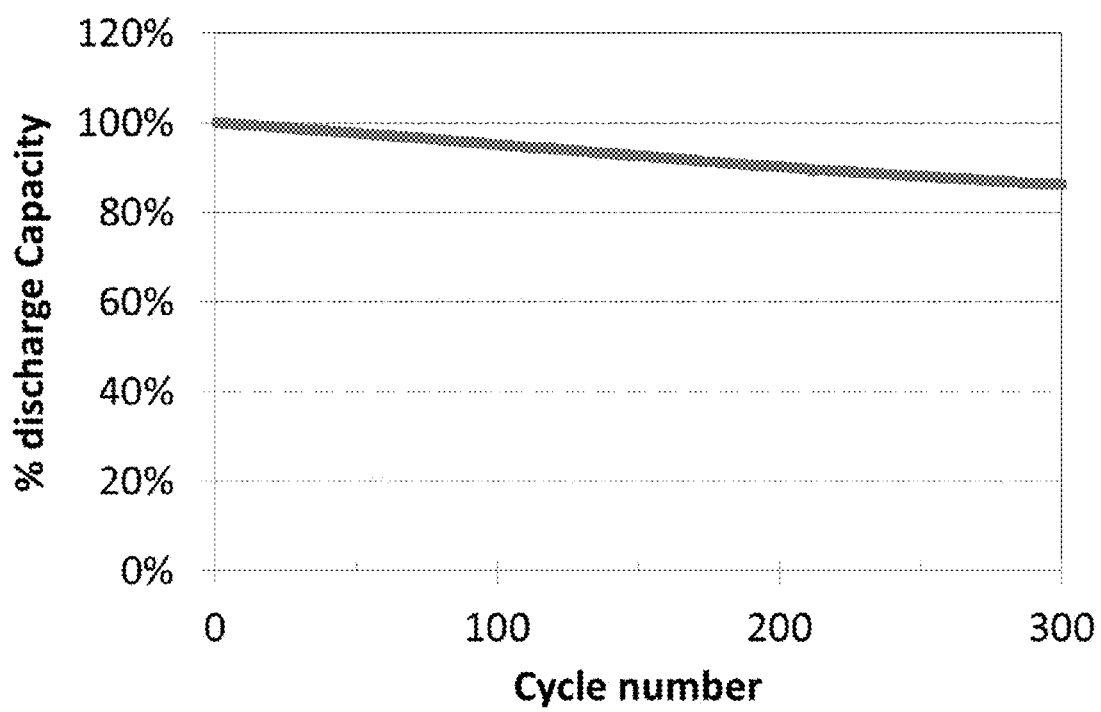
FIG. 11 is a graph showing the cycle life of the battery described in Example 6.

Each test cell was first fabricated in the discharged state. After fabrication it was subject to charging at a current of C/20 to a voltage of 4.2V, using a Maccor 4000 tester, followed by discharging at a constant current of C/5 to 2.5V. Hereafter, "C" corresponds to the discharge capacity of the cells. The cell was cycled between 2.5 V and 4.2 V at a constant current of C/2. Capacity being expressed as a percentage of the initial discharge capacity was plotted (FIG. 11).

Lithium-ion cells were fabricated by usual processes to those skilled in the art of cylindrical 18650 cell manufacturing. However, the cathode current collector aluminum foil was coated by DAG EB-815 conductive dispersion (Henkel Corp.) at 2-4 um thickness as described in example 1 above. The conductive coating was cured at 250° C. for 30 min temperature prior to coating of active cathode film.

Cathode coating was made by mixing 87 wt % LiNiCoMnO$_2$ powder (3M), 5 wt % Super P—Li carbon (Timcal), 6 wt % Kynar 301F (Arkema), and 2 wt % KS6 graphite (Timcal) in N-Methyl-2-pyrrolidone solvent at 55% solid content. Thin film coatings were cast at an area loading of 21 mg/cm$^2$/side on both sides of the protected Aluminum foil. The coating film is then compressed to a density of 3.2 g/cm$^3$. Anode coating was made by mixing 88 wt % Mesoporous graphite powder (Hitachi), 2 wt % Super P—Li carbon (Timcal), 2 wt % Kynar 301F (Arkema), and 2 wt % KS6 graphite (Timcal) in N-Methyl-2-pyrrolidone solvent at 50% solid content. Thin film coatings were cast at area loading of 11 mg/cm$^2$/side on both sides of 10 um thickness ED type copper foil (Oak-Mitsui). The coating film is then compressed to a density of 1.5 g/cm$^3$.

Aluminum foil alloy 1245 with H18 temper and thickness of 18 μm (All Foils, Inc.) was selected for coating with conductive dispersion. Aluminum foil was spray-coated with EB-815 DAG dispersion, then dried continuously at 120° C. before heat treatment curing for 30 min at 250° C. Thickness of the coating was 1-2 μm per each side. An aluminum tab of 5 mm width and 100 um thickness was ultrasonically welded to the cathode current collector. Polyimide tape with adhesive layer was then put around the tab weld on both sides. A Nickel tab of 5 mm width and 100 um thickness was welded to the anode current collector. Polyimide tape with adhesive layer was then put around the tab weld on both sides.

A spiral roll was made by assembling the electrodes and separator layers into a spiral-wound design with separator material between the cathode and anode. A tri-layer separator material with 20 um total thickness was used (Celgard, NC) for winding the electrodes into a spiral roll. A semi-automatic winding machine was used to wind the electrodes into a jelly roll, while tension is maintained on 2 individual rolls of separator. After winding and taping, the spiral roll is inserted into a nickel plated steel can and the Nickel tab is welded to the can using a resistance welder. The can is grooved, after that the spiral rolls in the grooved can are dried under vacuum for 24 hours at 60° C.

Electrolyte solution was mixed inside a glove box with dry argon atmosphere. The salt $(CF_3SO_2)_2NLi$ (3M Company, MN) and the additives were dried under vacuum and 120° C. for 48 hours before use. An electrolyte solution was prepared by dissolving the salt at a concentration of 0.8M in a solvent mixture of 1 parts by weight ethylene carbonate and 3 part by weight ethyl methyl carbonate (carbonates from EM Science, Selectipur® battery grade). The corrosion inhibiting additives LiPF$_6$LiBOB and were dried at 120° C. for 48 hours. Then 0.2M LiPF$_6$ and 0.1M LiBOB were dissolved in electrolyte.

5.0 g of electrolyte are added to the cell and allowed to soak for 15 minutes before the header assembly is laser welded to the aluminum cathode tab. Sealant material is applied at the top of the groove inside the can and then the header assembly is crimped closed, creating a hermetic seal. The cell then begins an electrical formation process. After formation is completed, as described above, the cells proceed to cycle testing at room temperature, 40° C., and 60° C.

In a test according to means known in the art, the first cycle electrochemical efficiency was 87%. The accumulated capacity loss over 300 cycles was 15% at 60° C. This result is superior to what is known to one skilled in the art. The capacity retention as a function of cycle number for the cell of Example 1 is shown in graphical form (FIG. 11).

It is understood that the examples and embodiments described herein are for illustrative purposes only. Various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A lithium-ion electrochemical cell, the cell comprising:
 (i) an anode, the anode comprising an anode active material in electronically conductive contact with an anode current collector, wherein the anode active material is selected from the group consisting of lithium metal, carbon, lithium-intercalated carbon, lithium nitrides, lithium alloys, and lithium-alloy-forming compounds of tin, silicon, antimony, aluminum or titanium oxide;
 (ii) a cathode exhibiting an upper charging voltage in the range of 3 to 5 volts with respect to a Li/Li$^+$reference electrode, the cathode comprising:
  a cathode current collector comprising:
   aluminum or an aluminum alloy; and
   a porous coating, the porous coating comprising a mixture of conductive carbon and graphite, wherein the coating is a composite further comprising a polymer;
   wherein the porous coating has a practical thickness of 0.1 to 8 micrometers; wherein the porous coating has a topography of variable peaks and valleys; wherein at least some valleys expose an aluminum or aluminum alloy surface; and
  a film on the exposed aluminum or aluminum alloy surfaces; and
  a cathode active material placed on top of the porous coating, the cathode active material comprising a lithium insertion transition metal oxide or phosphate;
 (iii) an ion-permeable membrane as a separator between the anode and cathode; and
 (iv) an electrolyte solution being in ionically conductive contact with the anode and cathode, the electrolyte solution comprising (a) an additive, (b) a lithium compound, and (c) at least one aprotic polar-solvent, a polymer, or a mixture of at least one aprotic polar solvent and a polymer;
 the lithium compound being at a concentration from about 0.1 to 3 molar, wherein the lithium compound is $C_2F_5SO_2N^-(Li^+)SO_2C_2F_5$ or $FSO_2N^-(Li^+)SO_2F$; and
 the additive providing corrosion protection of the cathode current collector, the anode current collector, or both current collectors; wherein the additive is selected from the group consisting of LiBOB, LiF, LiFOB, LiPF$_6$, LiBF$_4$, LiAsF$_6$, LiClO$_4$, and LiPF$_n$(R$_f$)$_m$; wherein n+m is 6, and R$_f$ is CF$_3$ or C$_2$F$_5$; and wherein the additive creates the film on the exposed aluminum or aluminum alloy surfaces of the cathode current collector.

2. The electrochemical cell of claim 1, wherein the lithium compound is $C_2F_5SO_2N^-(Li^+)SO_2C_2F_5$.

3. The electrochemical cell of claim 1, wherein the cathode current collector comprises an aluminum alloy.

4. The electrochemical cell of claim 1, wherein the additive providing corrosion protection is LiBOB.

5. The electrochemical cell of claim 1, wherein the additive providing corrosion protection is a mixture of LiBOB and $LiPF_6$.

6. The electrochemical cell of claim 1, wherein the coating comprises conductive carbon.

7. The electrochemical cell of claim 1, wherein the lithium compound is $FSO_2N^-(Li^+)SO_2F$.

8. The electrochemical cell of claim 1, wherein the anode active material comprises carbon, and wherein the carbon is selected from the group consisting of graphite microbeads, natural graphites, artificial graphites, carbon fibers, and graphitic flakes.

9. The electrochemical cell of claim 1, wherein the anode active material, the lithium insertion transition metal oxide or phosphate, or both are in a particulate form;
and wherein the particulate form ranges from 1 to 100 micrometers in average equivalent spherical diameter.

10. The electrochemical cell of claim 1, wherein the electrochemical cell is charged to a lower voltage than an upper charging voltage.

11. The electrochemical cell of claim 1, wherein the lithium insertion transition metal oxide or phosphate is selected from the group consisting of $LiCoO_2$; spinel $LiMn_2O_4$; chromium-doped spinel lithium manganese oxides; layered $LiMnO_2$; $LiNiO_2$; $LiNi_xCo_{1-x}O_2$, wherein x is $0<x<1$; $LiNi_{1-x-y}Co_xMn_yO_2$, wherein x is $0<x<1$, and wherein y is $0<y<1$; vanadium oxides; $LiFePO_4$; $LiMnPO_4$; and $LiVPO_4$.

12. The electrochemical cell of claim 9, wherein the lithium insertion transition metal oxide or phosphate, is a lithium insertion transition metal oxide selected from the group consisting of $LiCoO_2$; $LiMn_2O_4$; $LiNiO_2$; $LiNi_xCo_{1-x}O_2$, wherein x is $0<x<1$; $LiNi_{1-x-y}Co_xMn_yO_2$, wherein x is $0<x<1$, and wherein y is $0<y<1$.

13. The electrochemical cell of claim 1, wherein the electrolyte solution comprises an organic carbonate.

14. The electrochemical cell of claim 13, wherein the organic carbonate is selected from the group consisting of ethylene carbonate, propylene carbonate, dimethyl carbonate, diethyl carbonate, ethyl methyl carbonate, and mixtures thereof.

15. The electrochemical cell of claim 1, wherein the electrolyte solution is a solution of the lithium compound in an organic carbonate;
wherein a concentration of the lithium compound in the electrolyte solution is from about 0.1 to 2 molar; and
wherein the organic carbonate is selected from the group consisting of ethylene carbonate, propylene carbonate, dimethyl carbonate, diethyl carbonate, and ethyl methyl carbonate.

16. The electrochemical cell of claim 1, wherein the film comprises a member selected from the group consisting of aluminum oxide, aluminum fluoride, aluminum oxalatoborate or other boron-containing compound, or a mixture thereof.

17. The electrochemical cell of claim 1, wherein the additive is selected from the group consisting of LiF and $LiAsF_6$.

* * * * *